United States Patent [19]

Glück et al.

[11] 3,970,577

[45] July 20, 1976

[54] WATER-DISPERSIBLE ALUMINIUM PASTES

[75] Inventors: Wolfgang Glück; Lothar Benek, both of Haus, Germany

[73] Assignee: Messrs. Eckart-Werke Standard-Bronzepulver-Werke Carl Eckart, Fuerth, Bayern, Germany

[22] Filed: Jan. 13, 1975

[21] Appl. No.: 540,608

[30] Foreign Application Priority Data

Jan. 17, 1974  Germany............................ 2402073

[52] U.S. Cl................................. 252/182; 106/122
[51] Int. Cl.²............................................ C09K 3/00
[58] Field of Search........................ 252/188; 149/6; 106/122

[56] References Cited
UNITED STATES PATENTS

| | | | |
|---|---|---|---|
| 3,252,842 | 5/1966 | Williams | 149/6 |
| 3,507,719 | 4/1970 | Hodgson | 149/6 |
| 3,709,747 | 1/1973 | Nixon | 149/6 |
| 3,781,177 | 12/1973 | Kondis | 149/6 |

FOREIGN PATENTS OR APPLICATIONS

| | | |
|---|---|---|
| 1,193,149 | 5/1970 | United Kingdom |
| 348,657 | 5/1931 | United Kingdom............ 149/6 |

*Primary Examiner*—Leland A. Sebastian
*Attorney, Agent, or Firm*—Marn & Jangarathis

[57] ABSTRACT

Aluminium powder is ground in an organic liquid in the presence of a hydrophillic polymer; in particular, a high molecular weight wax, to produce a paste of aluminium powder coated with the hydrophillic polymer, whereby the aluminium powder is readily dispersible in water.

8 Claims, No Drawings

WATER-DISPERSIBLE ALUMINIUM PASTES

This invention relates to water-dispersible aluminium pastes and their production and use.

Aluminium powder pastes are extensively employed to produce hydrogen in aqueous media. They are used inter alia in the manufacture of aerated cement. They should, as far as possible, satisfy the following criteria:
1. The paste should be dispersible in water.
2. The liquid paste-making medium should not constitute a hazard or nuisance to personnel using the paste.
3. The paste should be capable of storage for a prolonged period without chemical change.
4. The measures taken to fulfill the above requirements should not impair the reactivity of the paste.

These requirements are closely affected by the way the paste is manufactured. If the paste is produced by grinding the aluminium in the presence of e.g. white spirit or ligroin, the latter lowers the dispersibility of the paste in, and its wettability by, water which are essential for good reactivity of the aluminium particles. In one known process (German Offenlegungsschrift No. 1,592,851) anionic and acid wetting agents are therefore added to the aluminium powder during the grinding process and oil-soluble non-ionic emulsifiers are added after grinding.

These additives have an adverse influence on the subsequent chemical reactivity of the paste and hence also an adverse influence on the end product produced with the paste. A further important disadvantage of these pastes is that their content of volatile petroleum fractions is a nuisance to personnel concerned with their processing.

Another known aluminium paste is manufactured by grinding the metal in an aqueous medium. This paste does not possess the abovementioned disadvantages. However, there are limitations on its storability. Inhibitors may be added to the paste to improve its storability, but they in turn have an adverse influence on the subsequent course of reaction and on the end product.

Because of the disadvantages inherent in the known aluminium pastes, aluminium powder is frequently used instead. However, its handling presents a great problem because of the associated explosion hazard. Hence, safety requirements are more easily satisfied by the use of aluminium pastes.

Accordingly, the invention provides for the production of an aluminium paste which conforms very much better to the abovementioned requirements than do the known aluminium pastes.

In accordance with the present invention, there is provided a water dispersible aluminium powder paste comprised of a water-immiscible inert organic liquid having aluminium powder dispersed therein, which has been treated to render the surface thereof hydrophillic.

In accordance with the present invention, a water-dispersible aluminium powder paste is produced by grinding aluminium into finely divided particles in the presence of a hydrophillic polymer which can form a coating on the aluminium powder, dispersed in a water-immiscible inert organic liquid. The hydrophillic polymer, which is preferably non-emulsifying in relation to water and the grinding liquid, is added to the grinding liquid and acts as a lubricant during the grinding process and forms a coating on the aluminium particles. The hydrophillic polymer is preferably a high molecular weight wax, and the term "wax" as used herein refers to any waxy substance which behaves in this way. As a result of the hydrophillic coating on the aluminium powder, stirring the paste with water produces an inversion of the wetting of the aluminium particles, with the water displacing the grinding liquid.

As a consequence of this reversal of wetting and the absence of an emulsifier, the grinding liquid separates out, after stirring or dispersing the paste with water, as an almost clear phase which can easily be largely removed, for example by decanting or centrifuging, from the aqueous phase in which the aluminium particles are dispersed. The grinding liquid can be separated continuously or batchwise.

Particularly good results are obtained if the wax used is largely insoluble in the grinding liquid but is soluble in water. If, as is preferred, the grinding liquid is a petroleum fraction boiling in the range 50°–300°C., e.g. white spirit or ligroin, a polyglycol wax, e.g. a polyethylene oxide or polypropylene oxide wax, is preferably used as the grinding auxiliary. The polyglycol wax can be chemically modified, for example sulphonated. This under certain circumstances makes it possible to increase the hydrophillic character of the wax yet further.

After stirring the paste with water over 90 percent of the grinding liquid can be removed by decanting. The aluminium water dispersion which remains has a shelf life of several hours, which is sufficient for practical use. The small residual amount of grinding liquid does not interfere in use and does not constitute a nuisance or hazard to operatives.

When the aluminium paste of the invention is used, the problem of emulsifying the organic grinding liquid in water no longer arises. The choice of the hydrophillic substance, in particular a wax, used merely depends on the lubricating properties required for the grinding process and the inversion of the wetting of the aluminium particles, from the grinding liquid to water, when the paste is stirred with water.

Taking into account these requirements it is easy to find a substance appropriate to the grinding liquid used by simple experiment in each case.

The hydrophillic substance, employed as a grinding lubricant and coating for the aluminium, can be employed in an amount of 0.5 to 10% by weight based on the aluminium content of the mixture being ground.

The following examples illustrate the invention but it is to be understood that the scope of the invention is not limited thereby.

EXAMPLE 1

100 kg of aluminium powder having a particle size below 400 $\mu$, 100 l of white spirit and 2 kg of polyethylene oxide wax of molecular weight between 5,000 and 6,000 are introduced into a ball mill, having a diameter of 1 m and a length of 4 m and filled with approximately 3,500 kg of 5–15 mm. balls. After 7 hours grinding, the mixture is greatly diluted by further addition of white spirit, pumped out of the mill and sieved through a 120 $\mu$ sieve. The material which passes through the sieve is pressed out in a filter press so as to leave a residual white spirit content of about 20 percent. In this form, the paste is ready for dispatch.

Before use, the paste is stirred with water (ratio of paste to water, about 1:2 to 1:3). The mixture produced can be vibrated on a vibrator plate. This causes the white spirit to rise to the surface, whence it can be removed by decanting. The aluminium-water mixture left can be used directly for the manufacture of aerated cement.

Even sharper or more complete separation of the grinding liquid can be achieved if the mixture produced by stirring the paste with water is introduced into a centrifuge and centrifuged. An inner layer consisting essentially of the lighter grinding liquid (white spirit) forms in the drum of the centrifuge while the aluminium and water separate outwards. The various layers can be withdrawn continuously from the drum. Preferably, the aluminium and water withdrawn from the drum are subsequently again treated in a stirring device to achieve intimate mixing between the metal and the suspending water.

EXAMPLE 2

150 kg of aluminium powder having a particle size below 400 $\mu$, 120 l of white spirit and 5 kg of polypropylene glycol wax are introduced into a ball mill having a diameter of 1 m and a length of 4 m and filled with approximately 4,000 kg of 5–6 balls. After 7 hours grinding, the mixture is greatly diluted by further addition of white spirit, pumped out of the mill, and sieved through a 90 $\mu$ sieve. The material passing through the sieve is pressed out on a filter press so that about 20 percent residual white spirit remains. In this form the paste is ready for dispatch. It can be used by the procedure described in Example 1.

The present invention is particularly advantageous in that a water dispersible aluminium paste is provided which does not have the disadvantages of the pastes heretofore produced in the art by grinding in organic or aqueous media.

Numerous modifications and variations of the present invention are possible in light of the above teachings and, therefore, within the scope of the appended claims the invention may be practised otherwise than as particularly described.

What we claim is:

1. A method for producing a dispersion of aluminium particles in water which comprises preparing an aluminium containing paste by grinding aluminum into finely divided particles in the presence of a hydrophilic polymer dispersed in a water-immiscible inert organic liquid, mixing the paste with water and separating the phase of the water-immiscible organic liquid.

2. A process according to claim 1 wherein the said organic liquid is a petroleum fraction boiling in the range 50°–300°C.

3. A process according to claim 1 wherein the aluminium has a particle size below 150 $\mu$.

4. A process according to claim 1 wherein the polymer is a high molecular weight hydrophilic wax.

5. A process according to claim 4 wherein the proportion of the said wax is 0,5 to 10 % by weight of the aluminium.

6. A process according to claim 4 wherein the wax is non-emulsifying in relation to water and the grinding liquid.

7. A process according to claim 6 wherein the wax is insoluble in the organic liquid.

8. A process according to claim 4 wherein said wax is selected from the group consisting of polyethylene oxide or polypropylene oxide wax.

* * * * *